(12) United States Patent
Nguyen et al.

(10) Patent No.: US 7,729,687 B2
(45) Date of Patent: Jun. 1, 2010

(54) AUDIO DELIVERY OF CALLERID INFORMATION TO A WIRELESS COMMUNICATIONS DEVICE

(75) Inventors: Hong Thi Nguyen, Atlanta, GA (US); Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 690 days.

(21) Appl. No.: 10/113,189

(22) Filed: Apr. 1, 2002

(65) Prior Publication Data

US 2004/0038672 A1 Feb. 26, 2004

(51) Int. Cl.
*H04M 3/42* (2006.01)

(52) U.S. Cl. ............... 455/415; 379/88.02; 379/88.13; 379/88.19; 379/218.01

(58) Field of Classification Search ................ 379/67, 379/15.03, 15.04, 69, 221.08, 88.02, 88.13, 379/88.19, 218.01; 455/414, 415
See application file for complete search history.

(56) References Cited

U.S. PATENT DOCUMENTS

| | | | |
|---|---|---|---|
| 4,935,951 A | | 6/1990 | Robinson et al. |
| 4,993,058 A | | 2/1991 | McMinn et al. |
| 5,012,507 A | | 4/1991 | Leighton et al. |
| 5,089,954 A | * | 2/1992 | Rago ............... 707/10 |
| 5,161,180 A | | 11/1992 | Chavous |
| RE34,677 E | | 7/1994 | Ray et al. |
| 5,511,111 A | * | 4/1996 | Serbetcioglu et al. .... 379/88.01 |
| 5,526,406 A | | 6/1996 | Luneau |
| 5,572,576 A | * | 11/1996 | Klausner et al. ......... 379/88.11 |
| 5,588,051 A | * | 12/1996 | Berkowitz et al. .......... 379/243 |
| 5,621,379 A | | 4/1997 | Collins |
| 5,673,304 A | | 9/1997 | Connor et al. |
| 5,724,412 A | | 3/1998 | Srinivasan |
| 5,796,806 A | * | 8/1998 | Birckbichler ............. 379/88.2 |
| 5,805,587 A | | 9/1998 | Norris et al. |
| 5,883,942 A | * | 3/1999 | Lim et al. ............. 379/142.01 |
| 5,940,474 A | | 8/1999 | Ruus |
| 5,940,475 A | * | 8/1999 | Hansen ..................... 379/52 |
| 5,991,377 A | * | 11/1999 | Malik ................... 379/114.05 |
| 6,009,148 A | | 12/1999 | Reeves |

(Continued)

OTHER PUBLICATIONS

U.S. Appl. No. 11/318,110, filed Dec. 2005.

(Continued)

*Primary Examiner*—Gerald Gauthier
(74) *Attorney, Agent, or Firm*—Scott P. Zimmerman PLLC (57) ABSTRACT

Systems and methods for announcing audio calling identification information associated with an incoming communications signal from a calling party to a wireless communications device are disclosed. The invention makes use of a translatable telephone number associated with a wireless communications device of a subscribing customer. The translatable telephone number includes a wireless telephone number of a wireless communications device and also includes an access telephone number that is associated with an access address serviced by a communications network. The wireless communications device is typically serviced by a separate wireless communications network that connects with the communications network over a communications link. The calling party dials the access telephone number and the incoming communications signal is detected, decoded, and processed to generate an audio communication by the communications network. The communications network also maps the access address with the wireless telephone number and presents the audio calling identification information to the wireless communications network.

16 Claims, 4 Drawing Sheets

U.S. PATENT DOCUMENTS

| | | | |
|---|---|---|---|
| 6,011,473 | A | 1/2000 | Klein |
| 6,104,800 | A | 8/2000 | Benson |
| 6,144,644 | A | 11/2000 | Bajzath et al. |
| 6,208,718 | B1 | 3/2001 | Rosenthal |
| 6,208,726 | B1 | 3/2001 | Bansal et al. |
| 6,215,993 | B1* | 4/2001 | Ulveland .................... 455/415 |
| 6,219,413 | B1 | 4/2001 | Burg |
| 6,226,362 | B1* | 5/2001 | Gerszberg et al. ........ 379/88.13 |
| 6,259,692 | B1 | 7/2001 | Shtivelman |
| 6,307,920 | B1 | 10/2001 | Thomson et al. |
| 6,310,946 | B1 | 10/2001 | Bauer et al. |
| 6,343,115 | B1 | 1/2002 | Foladare et al. |
| 6,347,136 | B1 | 2/2002 | Horan |
| 6,356,756 | B1* | 3/2002 | Koster .................... 455/414.1 |
| 6,434,126 | B1* | 8/2002 | Park .......................... 370/328 |
| 6,476,763 | B2 | 11/2002 | Allen, Jr. |
| 6,505,163 | B1* | 1/2003 | Zhang et al. ................ 704/275 |
| 6,512,776 | B1 | 1/2003 | Jones |
| 6,529,500 | B1 | 3/2003 | Pandharipande |
| 6,529,726 | B1* | 3/2003 | Rhodes ....................... 455/406 |
| 6,539,080 | B1* | 3/2003 | Bruce et al. ............. 379/88.17 |
| 6,553,109 | B1* | 4/2003 | Hussain et al. ......... 379/207.02 |
| 6,603,977 | B1 | 8/2003 | Walsh et al. |
| 6,608,886 | B1 | 8/2003 | Contractor |
| 6,622,016 | B1* | 9/2003 | Sladek et al. ............ 455/414.1 |
| 6,624,754 | B1 | 9/2003 | Hoffman et al. |
| 6,661,785 | B1 | 12/2003 | Shang et al. |
| 6,665,388 | B2 | 12/2003 | Bedingfield |
| 6,665,390 | B1* | 12/2003 | Ekstrom ................. 379/201.01 |
| 6,665,611 | B1 | 12/2003 | Oran et al. |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,694,004 | B1* | 2/2004 | Knoerle et al. ......... 379/211.04 |
| 6,694,153 | B1* | 2/2004 | Campbell et al. ........... 455/560 |
| 6,703,930 | B2 | 3/2004 | Skinner |
| 6,704,576 | B1 | 3/2004 | Brachman |
| 6,714,637 | B1 | 3/2004 | Kredo |
| 6,718,021 | B2 | 4/2004 | Crockett et al. |
| 6,724,872 | B1 | 4/2004 | Moore et al. |
| 6,771,742 | B2 | 8/2004 | McCalmont et al. |
| 6,785,368 | B1* | 8/2004 | Eason et al. ............. 379/88.19 |
| 6,792,081 | B1 | 9/2004 | Contractor |
| 6,795,530 | B1* | 9/2004 | Gilbert et al. ................. 379/76 |
| 6,804,338 | B1* | 10/2004 | Chen ..................... 379/142.08 |
| 6,816,481 | B1 | 11/2004 | Adams et al. |
| 6,842,448 | B1 | 1/2005 | Norris et al. |
| 6,868,074 | B1 | 3/2005 | Hanson |
| 6,868,268 | B2* | 3/2005 | Worsham et al. ............ 455/415 |
| 6,888,927 | B1* | 5/2005 | Cruickshank et al. .... 379/88.11 |
| 6,909,900 | B1* | 6/2005 | Howe ......................... 455/445 |
| 6,912,399 | B2 | 6/2005 | Zirul et al. |
| 6,917,678 | B2* | 7/2005 | Cox et al. .............. 379/218.02 |
| 6,922,468 | B1* | 7/2005 | Dammrose et al. ..... 379/221.13 |
| 6,931,117 | B2 | 8/2005 | Roberts et al. |
| 6,940,950 | B2 | 9/2005 | Dickinson et al. |
| 6,944,444 | B1* | 9/2005 | Gillespie et al. ............ 455/417 |
| 7,079,638 | B1* | 7/2006 | Beauchamp et al. ........ 379/196 |
| 7,149,208 | B2 | 12/2006 | Mattaway |
| 7,254,219 | B1 | 8/2007 | Hansen et al. |
| 7,315,614 | B2* | 1/2008 | Bedingfield et al. .... 379/142.07 |
| 7,483,520 | B2* | 1/2009 | Han et al. ................ 379/88.03 |
| 7,486,779 | B2* | 2/2009 | Brown et al. ............ 379/88.02 |
| 7,499,537 | B2* | 3/2009 | Elsey et al. ............. 379/218.01 |
| 2002/0072348 | A1 | 6/2002 | Wheeler et al. |
| 2002/0085687 | A1* | 7/2002 | Contractor et al. ............ 379/76 |
| 2002/0160745 | A1 | 10/2002 | Wang |
| 2003/0099336 | A1* | 5/2003 | Speeney et al. .......... 379/88.19 |
| 2003/0123629 | A1 | 7/2003 | Hussain et al. ......... 379/207.02 |
| 2003/0123631 | A1* | 7/2003 | Moss et al. ............. 379/210.02 |
| 2003/0211839 | A1 | 11/2003 | Baum et al. |
| 2003/0216148 | A1 | 11/2003 | Henderson |
| 2004/0037403 | A1* | 2/2004 | Koch ..................... 379/142.16 |
| 2004/0057425 | A1 | 3/2004 | Brouwer et al. |
| 2004/0066920 | A1* | 4/2004 | Vandermeijden ......... 379/88.19 |
| 2004/0101123 | A1 | 5/2004 | Garcia |
| 2004/0128694 | A1 | 7/2004 | Bantz |
| 2004/0140928 | A1 | 7/2004 | Cleghorn |
| 2004/0170159 | A1 | 9/2004 | Kim |
| 2004/0194143 | A1 | 9/2004 | Hirose |
| 2004/0226045 | A1 | 11/2004 | Nadarajah |
| 2005/0047574 | A1 | 3/2005 | Reid |
| 2005/0063519 | A1 | 3/2005 | James |
| 2005/0151642 | A1 | 7/2005 | Tupler et al. |
| 2005/0175166 | A1 | 8/2005 | Welenson et al. |
| 2005/0190750 | A1 | 9/2005 | Kafka |
| 2005/0190892 | A1 | 9/2005 | Dawson et al. |
| 2005/0232243 | A1 | 10/2005 | Adamczyk |
| 2005/0250468 | A1 | 11/2005 | Lu |
| 2009/0225972 | A1* | 9/2009 | Kahn .................... 379/210.02 |

OTHER PUBLICATIONS

US 5,905,788, 05/1999, Bauer et al. (withdrawn)

* cited by examiner

AUDIO DELIVERY OF CALLERID INFORMATION TO A WIRELESS COMMUNICATIONS DEVICE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention relates to a system and method for audio delivery of caller identification information to wireless communications devices.

2. Description of the Related Art

Telecommunications has experienced explosive growth, and more growth is planned as telecommunication access and numerous communications devices improve. This explosive growth is revolutionizing special services offered to subscribing customers. Of the special service offerings, the most relevant to this invention is the caller identification or Caller ID service. A customer or a user of a telephone that is served by the Caller ID service is able to screen incoming calls by knowing what telephone number is calling before the user answers the phone. Presently available Caller ID systems provide a calling party's telephone number and a billing name associated with the calling party's telephone number (if available) when an incoming caller line identification (ICLID) signal can be detected, decoded, and transmitted to the serviced telephone or other display device associated with the serviced telephone. In recent years, telephony providers and manufacturers have tried to achieve vocalized announcement of the calling party's number and/or name to the serviced telephone.

For example, U.S. Pat. No. 5,796,806 entitled "Apparatus and Method for Spoken Caller Identification Using Signals of the Advanced Intelligent Network," discloses an apparatus and method for audio presentation of a calling party's name in a cellular environment. When a caller places a call to a cellular phone serviced by Caller ID, the cellular switch triggers identification of the caller by sending the ICLID signal along with the cellular telephone number to a data server located in cellular switching center. The user of the cellular phone can pre-record a list of names associated with phone numbers that are expected to originate calls to the cellular phone and the data server can fetch the caller's prerecorded name if there is a match with the ICLID. If the ICLID does not match any of the expected callers, then the telephone number of the caller can be spoken by the user answering the cellular phone by an Intelligent Peripheral attached to the cellular switch. Alternatively, if an ICLID signal is not detected, the data server can play a pre-recorded message of "unknown caller" or prompt the calling party to state his/her name and play the recorded calling party announcement to the user answering the cellular phone. The 5,796,806 patent, however, has several drawbacks that include necessitating expensive, specialized hardware and equipment in the cellular or mobile switching network, necessitating cooperation from the user to pre-record names and associate those names with telephone numbers of expected callers, and limiting the audio announcement to only the name or the number of the calling party.

BRIEF SUMMARY OF THE INVENTION

This invention addresses the above needs by providing systems and methods for announcing audio calling identification information associated with an incoming communications signal from a calling party to a wireless communications device. This invention makes use of a translatable telephone number associated with a wireless communications device of a subscribing customer. The translatable telephone number includes a wireless telephone number of a wireless communications device and also includes an access telephone number that is associated with an access address serviced by a communications network, such as the Public Switched Telephone Network (PSTN). Typically, the wireless communications device is serviced by a wireless communications network, such as the Mobile Switching Network, and the wireless communications network connects with the communications network over a communications link. The calling party dials the access telephone number and the incoming communications signal is detected, decoded, and processed to generate an audio communication in the communications network. The communications network also maps the access address with the wireless telephone number and presents the audio calling identification information to a switch or other similar device in the wireless communications network servicing the wireless telephone number. When the subscribing customer or the user of the wireless communications device receives the incoming communications signal, the audio calling identification information is played. Thereafter, the customer or user may act on the incoming communications signal. For example, the customer or user may answer the call, forward the call to voicemail, or decline the call.

In an embodiment, a communications system includes a first communications switch or other similar device connected with a wireless communications device having a translatable telephone number, the translatable telephone number including a wireless telephone number associated with a wireless communications device and an access telephone number associated with an access address in a communications network and includes a second communications switch or other similar device connected to a second communications device. The communications network connects the first switch to the second switch and is operable to access caller identification information associated with the second communications device and to process the caller identification information associated with the second communications device. The communications network is also operable to initiate delivery of the caller identification information to the wireless telephone number. Further, the system may include a wireless audio calling name application coupled with the communications network. The wireless audio calling application includes a translatable telephone number database associating the wireless telephone number with the access telephone number. Still further, the communications network may also include an audio presentation application that operates to present the caller identification information as an audio communication, such as text-to-speech application.

In another embodiment, a method for providing audio delivery of caller identification information includes detecting an incoming communications signal from a communications switch or other similar device in a communications network to a subscriber's translatable telephone number, processing the incoming communications signal to designate an originating telephone number associated with the incoming communications signal, comparing the originating telephone number with caller identification information and other data stored in a database in the communications network, and determining whether to initiate audio delivery of the caller identification information. If audio delivery of the caller identification information is activated, then the method further includes mapping the translatable telephone number from the access telephone number to the wireless telephone number and presenting the caller identification information as an audio communication to the wireless telephone number. In addition, the method may include performing a default function if the incoming telephone number fails to match data in the database.

Further details on these embodiments and other possible embodiments of this invention are set forth below. As is appreciated by those of ordinary skill in the art, this invention has wide utility in a number of areas as illustrated by the discussion below.

In another embodiment, this invention provides audio caller identification information that may include information or data on at least one of the following: an originating telephone number; a name associated with the originating telephone number; a time identifier that provides the time that the incoming communication is first detected; a date identifier that provides the date that the incoming communication is received; and a geographic identifier of the originating telephone number.

In another embodiment, this invention provides audio caller identification information to a variety of wireless communications devices capable of presenting voice communications via a wireless network, such as, for example, a wireless phone, a cellular phone, a satellite phone, a computer, a modem, an audio pager, a personal digital assistant, a digital signal processor, a global positioning system transceiver, an interactive television, and similar communications devices.

In another embodiment, this invention uses a translatable telephone number that is capable of linking a variety of wireless communications devices with the Public Switched Telephone Network to detect, decode, generate, and present the audio caller identification information.

In another embodiment, this invention delivers the audio caller identification information to the wireless communications device without incurring toll charges to the originating telephone number associated with the calling party.

In another embodiment, this invention forwards the audio caller identification information using rules established by a subscriber, a calling party, a forwarding party, an administrator, and/or other constraints (e.g., availability and load of the communications link to the remote communications device).

These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

This invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, the described systems and methods are employed with telephone systems using the North American Numbering Plan (NANP) that consists of a four-digit subscriber number, a three-digit exchange code, and a three-digit area code. However, non-NANP number schemes may also be employed. Further, like numbers refer to like elements throughout.

Figure 1:
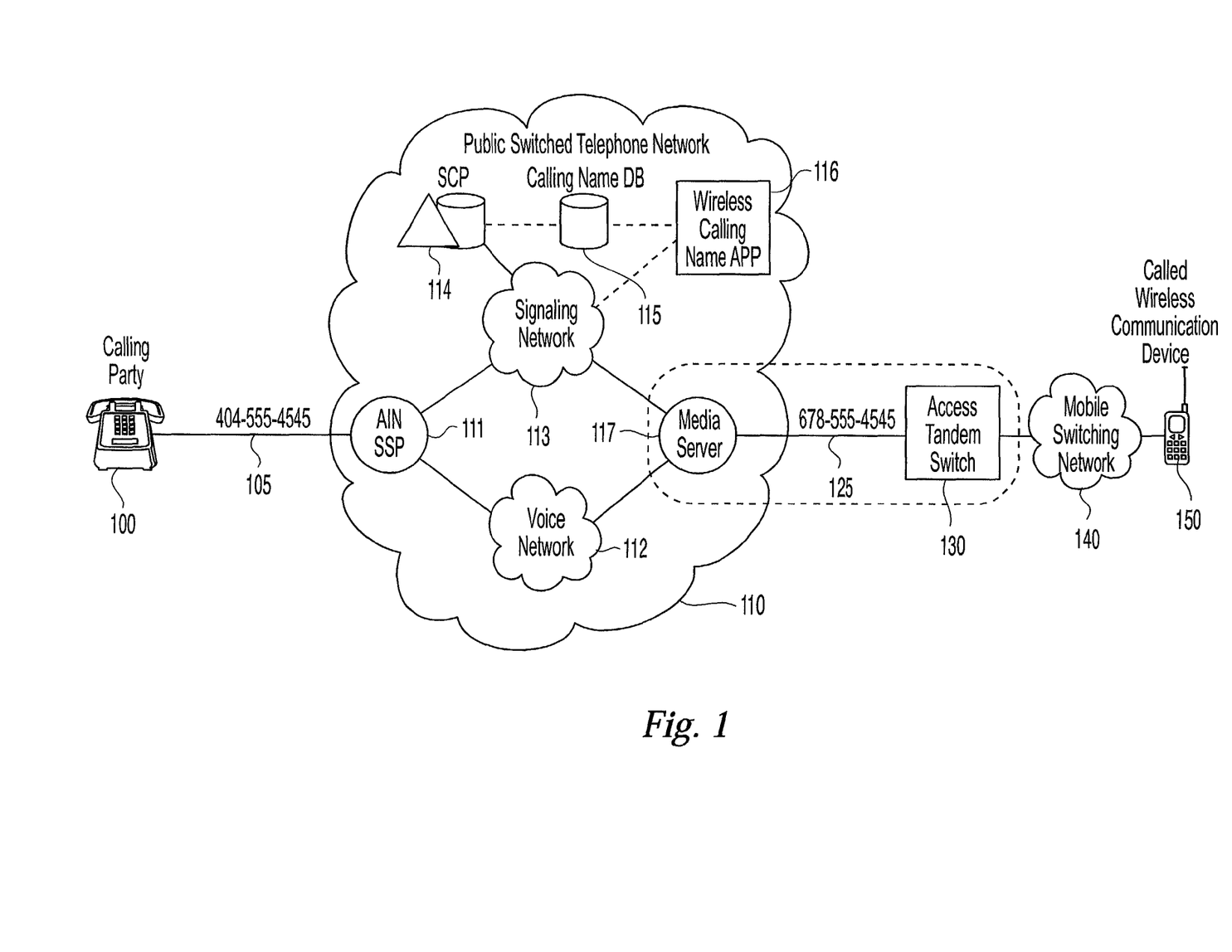
FIG. 1 is a schematic drawing of a communications system for audio delivery of caller identification information to a wireless telephone in an embodiment of this invention.

FIG. 1 illustrates a communications system for audio delivery of caller identification information to a wireless telephone in an embodiment of this invention. A calling party places a call to a wireless communications device 150 from a second communications device 100. As used herein, the term "wireless communications device" refers to a variety of devices capable of presenting voice communications via a wireless network and having an addressable connections to the wireless network for delivery of the incoming communication. For example, wireless communications devices include a wireless phone, a cellular phone, a satellite phone, a computer, a modem, an audio pager, a personal digital assistant, a digital signal processor, a global positioning system transceiver, an interactive television and the like. The second communications device has a NANP of "404-333-3232" and is hereinafter referred to as the originating telephone number. The calling party places the call to the wireless communications device using an access address 105 ("404-555-4545") that presents the call to a service switching point (SSP) 111 that connects the call to a Public Switched Telephone Network (PSTN) 110 containing Advanced Intelligence Network (AIN) elements that are well known to one of ordinary skill in the telecommunications art.

The SSP 111 sends a query message to a signaling network 113, and more specifically, to a Service Control Point (SCP) 114 that operates as a database processor and server. The SCP executes a query to retrieve calling identification information associated with the originating telephone number (e.g., a TR1188 query). Typically, the calling identification information stored by the PSTN 110 includes information like the originating telephone number, a name of the calling party associated with the originating telephone number, a time identifier that provides the time that the incoming communication is first detected, a date identifier that provides the date that the incoming communication is received, and a geographic identifier of the originating telephone number (that is commonly decoded using the NANP scheme and other data). The SCP also performs the routing translation that maps the access address telephone number 105 ("404-555-4545") to a wireless telephone number 125 ("678-555-4545"). In this embodiment, the routing translation data is stored in a calling name database 115 coupled with the SCP. Once the routing translation is completed, the SCP sends a forward call message to the SSP with the following fields:

CalledPartyID (access address)=Service Node Number; and

RedirectingPartyID=wireless telephone number.

A wireless calling name application 116, such as, for example, a text-to speech application using state-of-the-art technology, receives the caller identification information and processes the information to generate an audio caller identification communication. Thereafter, the audio caller identification communication is sent to a media server 117 that originates the call to an access tandem switch 130 coupled with a Mobile Switching Network 140 that services the wireless telephone number 150. Alternatively, the audio caller identification communication may be sent to a telecommunications switch or other network element (not shown) capable of presenting the audio communication to the Mobile Switching Network. After the wireless customer or user answers the phone, the media player plays the audio calling identification information. Thereafter, the media player transfers the call to the access tandem switch 130 and trunks to the media player are released.

Figure 2:
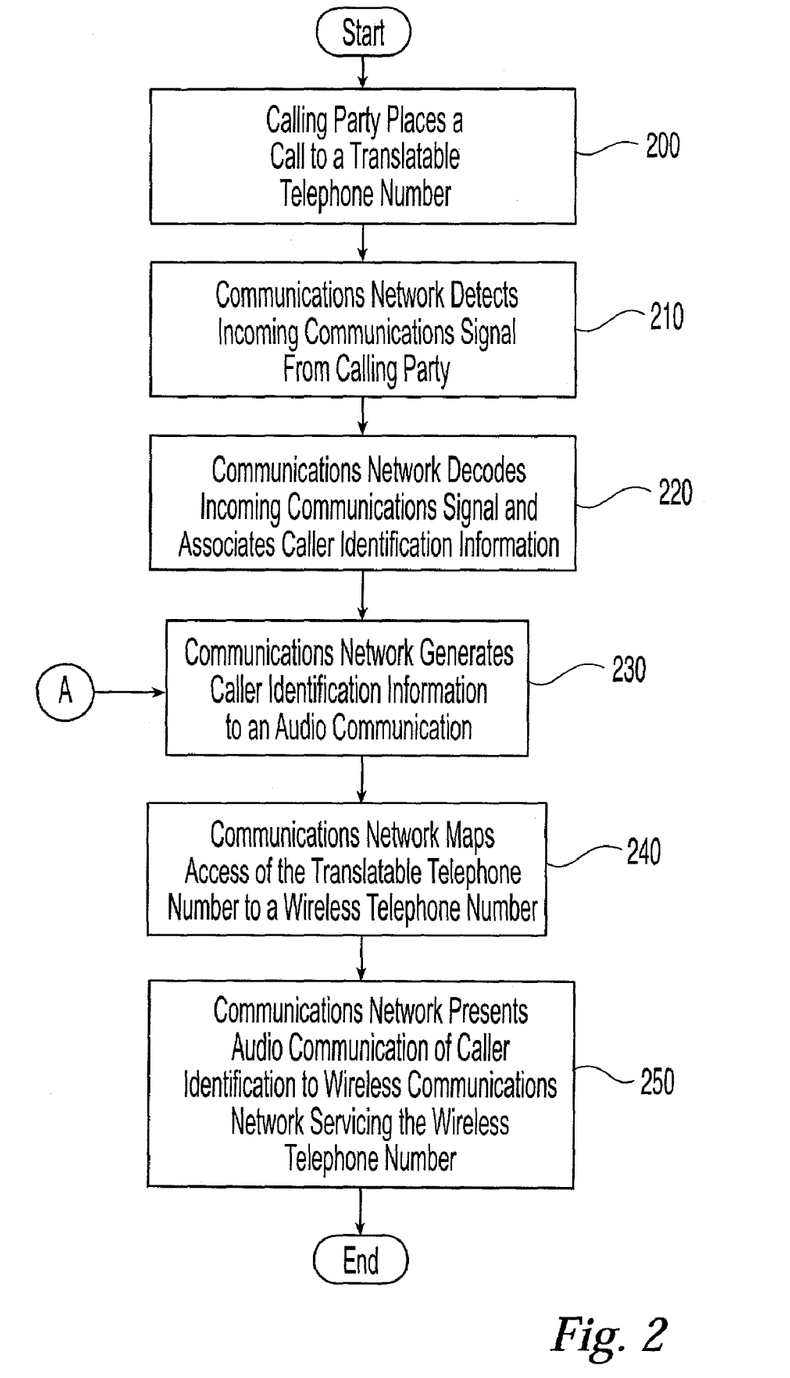
FIG. 2 is a flowchart of an overview of a communications method for audio delivery of caller identification information to a wireless telephone in another embodiment of this invention.

FIG. 2 illustrates a flowchart showing the overview of a process for audio delivery of caller identification information to a wireless telephone in another embodiment of this invention. The calling party places a call to the access address (shown as reference numeral 105 in FIG. 1) (404-555-4545) of a translatable telephone number [block 200]. The communications network (shown as reference numeral 110 in FIG. 1) recognizes the incoming communications signal [block 210] and decodes the incoming communications signal (i.e., decodes the data associated with the originating telephone number 100 (404-333-3232)) to obtain caller identification information from a database associated with the communications signal [block 220]. After the caller identification information is retrieved (FIG. 2 assumes that the information is available), the communications network processes the caller identification information to generate an audio communication [block 230] using the wireless calling name application (shown as reference numeral 116 in FIG. 1) that is coupled with the communications network. The wireless calling name application uses state-of-the-art text-to-speech and other related technology to process a data format of the caller identification information to an audio communication that can be presented to the wireless communications device. The communications network also maps the access address of the translatable telephone number with the wireless telephone number (678-555-4545) associated with the wireless communications device [block 240] (the wireless telephone number and the wireless communications device, respectively, are shown as reference numerals 125 and 150 in FIG. 1). The translatable telephone data (e.g., a table, map, or other similar association of the access address with the wireless telephone number) may be stored in a separate calling name database (shown as reference numeral 115 in FIG. 1). Alternatively, the translatable telephone data may be stored in a collective database, such as the database that stores the calling identification information. Thereafter, the communications network uses the wireless telephone number to present the audio caller identification communication to the mobile switching network (shown as reference numeral 140 in FIG. 1) or wireless communications network servicing the wireless communications device.

Figure 3:
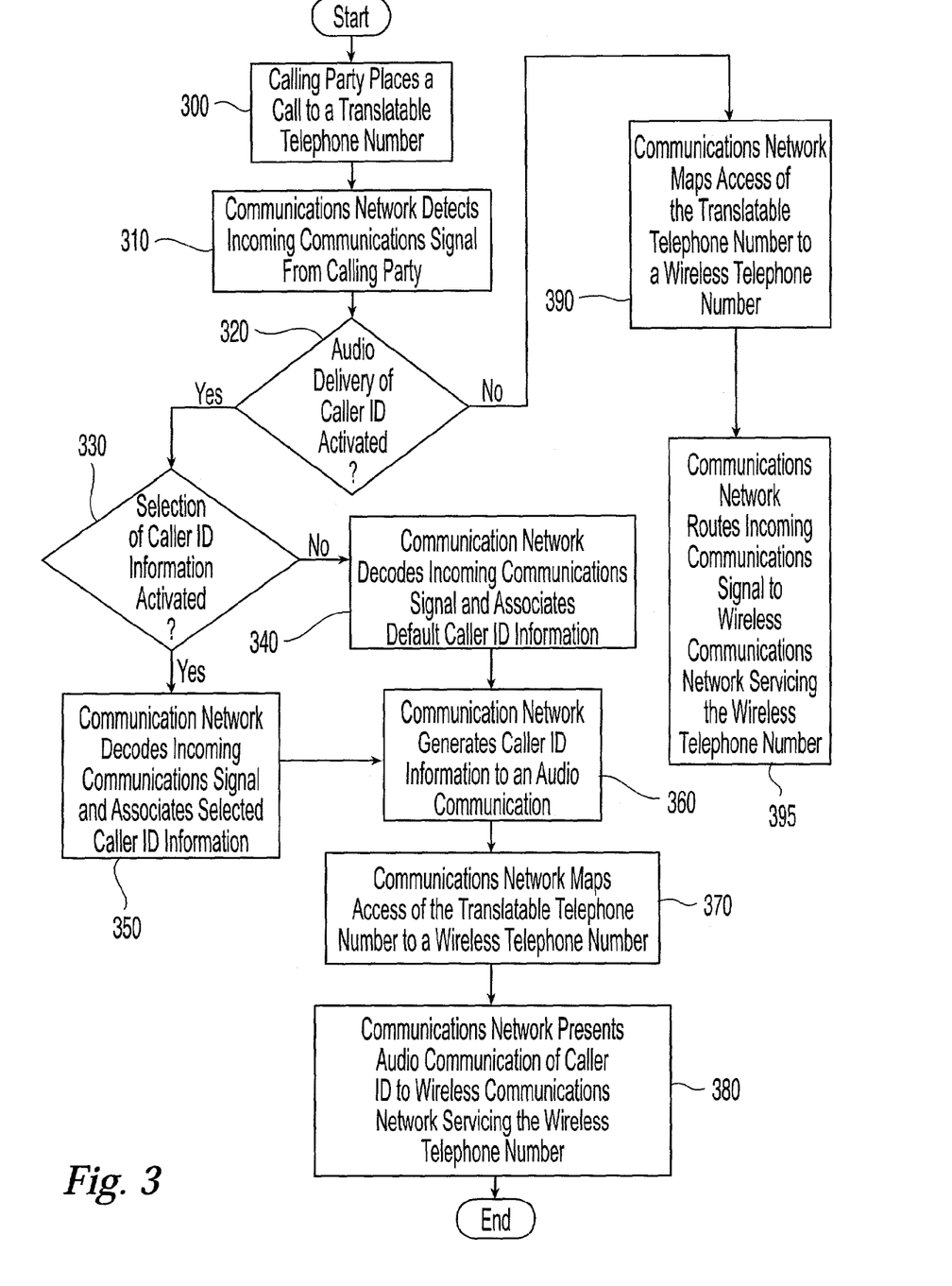
FIG. 3 is a flowchart of another embodiment of a communications method that allows a subscribing customer to activate the audio delivery of caller identification information to a wireless telephone service and that allows the customer to select caller identification information for audio presentation.

This invention may also be implemented in the embodiment shown in FIG. 3. This process is similar to the process shown in FIG. 2; however, this communications method allows a subscribing customer to activate the audio delivery of caller identification information and also allows the customer to select specific caller identification information for audio presentation. Steps 300 and 310 are similar to 200 and 210, respectively. Thereafter the communications network 110 determines whether audio delivery of caller identification is activated [block 320]. If not, the communications network maps the access address (404-555-4545) of the translatable telephone number with the wireless telephone number 125 (678-555-4545) associated with the wireless communications device 150 [block 390] and routes the call to the wireless communications network 140 servicing the wireless telephone number [block 395]. Alternatively, the subscribing customer or user of the wireless communications device could provide the calling party directly with the wireless telephone number and, thus, bypass the mapping process.

If audio delivery is activated, the communications network 110 may further query whether the subscribing customer (or user, administrator, calling party, or the like) has selected content and presentation options of the caller identification information [block 330]. If so, the communications network decodes the incoming communications signal to obtain caller identification information from a database associated with the communications signal [block 350]. Caller identification information may include a variety of different data fields, such as, for example, the originating telephone number, a name associated with the originating telephone number (e.g., a party that pays the telephone bill), a time identifier that provides the time that the incoming communication is first detected, a date identifier that provides the date that the incoming communication is received, a geographic identifier of the originating telephone number and other data accessible through the communications network. Using such information, the customer may elect to hear the name and the time identifier in the audio caller identification communication. Still further, the customer may elect to have the name played first and the time identifier played second. As will become apparent to one of ordinary skill in the art, a variety of information may be selected and arranged for audio presentation. The selection and arrangement of the audio presentation may be programmed over a variety of different mediums, such as, for example, an interactive web-enable graphical user interface (GUI), a voice-activated menu prompt, an interactive session with an communications network administrator, and the like.

Thereafter, the selection preferences (e.g., selected data fields associated with the caller identification for audio presentation) are processed to generate an audio caller identification communication [block 360], the access address 105 (404-555-4545) is mapped to the wireless telephone number 125 (678-555-4545) [block 370], and the audio caller identification communication is presented to the wireless communications network 140 servicing the wireless telephone number [block 380].

If selection of caller identification information is not activated, the communications network 110 decodes the incoming communications signal from the originating telephone number 100 (404-333-3232) and associated default caller identification information [block 340]. For example, only the name associated with the originating telephone number may be presented as an audio communication. Thereafter, the default selection of caller identification information is processed to generate the audio caller identification communication [block 360], the access address 105 (404-555-4545) is mapped to the wireless telephone number 125 (678-555-4545) [block 370], and the audio caller identification communication is presented to the wireless communications network 140 servicing the wireless telephone number [block 380].

Figure 4:
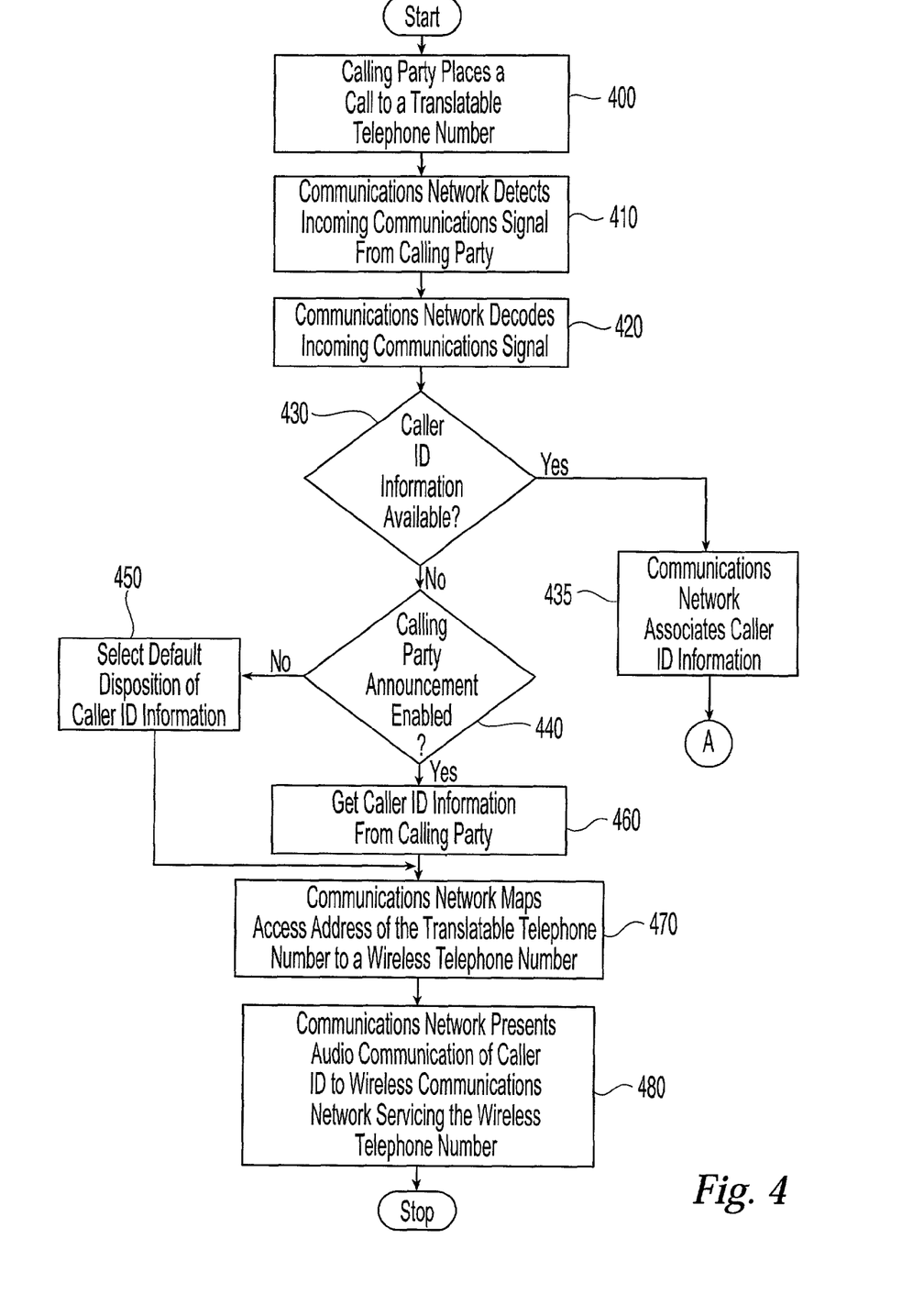
FIG. 4 is a flowchart of another embodiment of a communications method for audio delivery of caller identification information to a wireless telephone when caller identification information is not available in the communications network.

This invention may also be implemented in the embodiment shown in FIG. 4. This process is similar to the processes in FIG. 2; however, this communications method provides caller identification information to a wireless communications device when caller identification information is not available in the communications network 110. Steps 400 and 410 are similar to 200 and 210, respectively. Thereafter, the communications network decodes the incoming communications signal [block 420] and tries to obtain caller identification information [block 430]. If caller identification information is available, the communications network retrieves and associates the information [block 435]. Thereafter, the caller identification information may be processed similarly to the process disclosed in blocks 230-250 of FIG. 2.

If, however, caller identification is not available to the communications network, then the communications network launches a query to determine whether calling party announcement is enabled [block 440]. If so, the communications network prompts the calling party to provide either "keyed-in" or "voice-recorded" caller identification information [block 460]. As used herein, the term "keyed-in" information refers to information that a calling party would key in, such as, for example, dual tone modal frequencies (DTMF) on a keypad of a telephone. Also, as used herein, the term "voice-recorded" information refers to information that a calling party would speak, such as, for example, spoken text into the headset of a telephone. Thereafter, the caller identification information may be processed similarly to the process disclosed in blocks 230-250 of FIG. 2.

If the calling party announcement is not enabled (or if a calling party does not participate), then the communications network may select a default disposition of the caller identification information [block 450]. For example, the communications network may associate that the information is "private," "not available," "blocked," or "declined." As used herein, the term "private" refers to a private or restricted telephone number, such as, for example, an unlisted number. As used herein, the term "not available" refers to a telephone number that cannot be decoded by the communications network. As used herein, the term "blocked" refers to a telephone number that is blocked by a calling party so that the originating telephone number is not provided. As used herein, the term "declined," refers to a calling party that opts out of providing the calling party announcement discussed above. Thereafter, the default disposition may be processed similarly to the process disclosed in blocks 230-250 of FIG. 2.

While the processes in FIGS. 2-4 are shown in series, these processes may occur in different orders and/or at simultaneous times as one of ordinary skill in the art will understand. Further, while the disclosed system and methods indicate that the audio caller identification information is played by the media player and then the call is transferred to the access tandem switch to release trunks to the media player, the subscribing customer may opt to activate a call handling feature after hearing the audio calling identification communication. For example, call handling may be allowing the customer to accept the call, allowing the customer to send the call to voicemail, allowing the customer to send the calling party a message that the customer is unavailable to take the call, forwarding the incoming communication to another telephone number, or rejecting the call.

This invention may further include billing systems and methods associated with providing audio delivery of caller identification information to a wireless communications device. For example, the billing systems and methods may involve assigning financial allocators for local communications fees, long distance communications fees, toll-free communications fees, shared fees between the subscribing customer and the calling party, wireless audio delivery subscription fees, and fees sponsored by a third party (such as an advertiser).

While several implementation of various embodiments of this invention are described herein, various modifications and alternate embodiment will occur to those skilled in the art. For example, the disclosed communications network, the PSTN, includes network elements that are evolving and include pre-AIN, AIN, and post-AIN technologies using various platforms, software, and peripheral devices. The communications network, for example, could also include a packet-based "softswitch" that uses software control to provide voice, data, and video services by dynamically changing its connection data rates and protocols types. In this case the AIN componentry is replaced by an application server that interfaces with the softswitch via a packet protocol, such as Session Initiation Protocol (SIP). Alternate communications networks will use different implementation elements, platforms, software, and devices. Accordingly, this invention is intended to include those other variations, modifications, and alternate embodiments that adhere to the spirit and scope of this invention.

What is claimed is:

1. A system providing audio delivery of caller identification information, the system comprising:
   a processor communicating with a database, the processor;
   receiving a call from an originating telephone number to a dialed access number;
   retrieving calling identification information associated with the originating telephone number;
   translating the dialed access number to a wireless telephone number associated with a wireless communications device;
   sending a forward call message having a CalledPartyID field changed from the dialed access number to a service node number and having a RedirectingPartyID field set to the wireless telephone number;
   generating an audio caller identification communication that audibly represents the calling identification information; and
   sending the audio caller identification communication to a media server.

2. The system of claim 1, wherein the processor originates a new call from the media server to the wireless telephone number associated with the wireless communications device.

3. The system of claim 2, further comprising:
   i) after the call is answered at the wireless telephone number, means for playing the audio calling identification information,
   ii) means for transferring the call for connection to the originating telephone number, and
   iii) means for releasing trunks to the media server.

4. The system of claim 1, wherein when audio delivery of caller identification is inactivated, then the processor routes the call to the wireless telephone number associated with the wireless communications device.

5. The system of claim 1, wherein when the calling identification information is unavailable, then the processor queries whether calling party announcement is enabled.

6. The system of claim 5, wherein the processor further sends a prompt to provide the calling identification information.

7. The system of claim 5, wherein when the calling party announcement is disabled, then the processor selects a default disposition of the calling identification information.

8. The system of claim 5, wherein when a calling party fails to participate in the calling party announcement, then the processor selects a default disposition of the calling identification information.

9. The system of claim 1, the calling identification information comprising at least one of:
  (a) the originating telephone number;
  (b) a name associated with the originating telephone number;
  (c) a time identifier;
  (d) a date identifier; and
  (e) a geographic identifier of the originating telephone number.

10. The system of claim 1, wherein after the audio caller identification communication presented, the processor activates a call handling feature.

11. A method for providing audio delivery of caller identification information, comprising:
  receiving a call to a dialed access number;
  retrieving calling identification information associated with an originating telephone number;
  querying a calling name database for translation information;
  translating the dialed access number to a wireless telephone number associated with a wireless communications device using the translation information from the calling name database;
  sending a forward call message having a CalledPartyID field changed from the dialed access number to a service node number and having a RedirectingPartyID field set to the wireless telephone number;
  generating an audio caller identification communication that audibly represents the calling identification information;
  sending the audio caller identification communication to the media server;
  originating another call from the media server to the wireless telephone number; and
  playing the audio caller identification communication to the wireless telephone number.

12. The method of claim 11, further comprising originating the another call from the media server to a switch servicing the wireless telephone number associated with the wireless communications device.

13. The method of claim 12, further comprising:
  i) after the call is answered at the wireless telephone number, playing the audio calling identification information,
  ii) transferring the call for connection to the originating telephone number, and
  iii) releasing trunks to the media server.

14. The method of claim 12, wherein when audio delivery of caller identification is inactivated, then routing the call to the wireless telephone number associated with the wireless communications device.

15. The method of claim 11, further comprising:
  providing means to select preferences in the generation of the caller identification information.

16. The method of claim 15, wherein when selection of preferences is inactivated, then associating default caller identification information.

* * * * *